J. C. HOFFEDITZ.
CULTIVATOR.
No. 60,892. Patented Jan. 1, 1867.
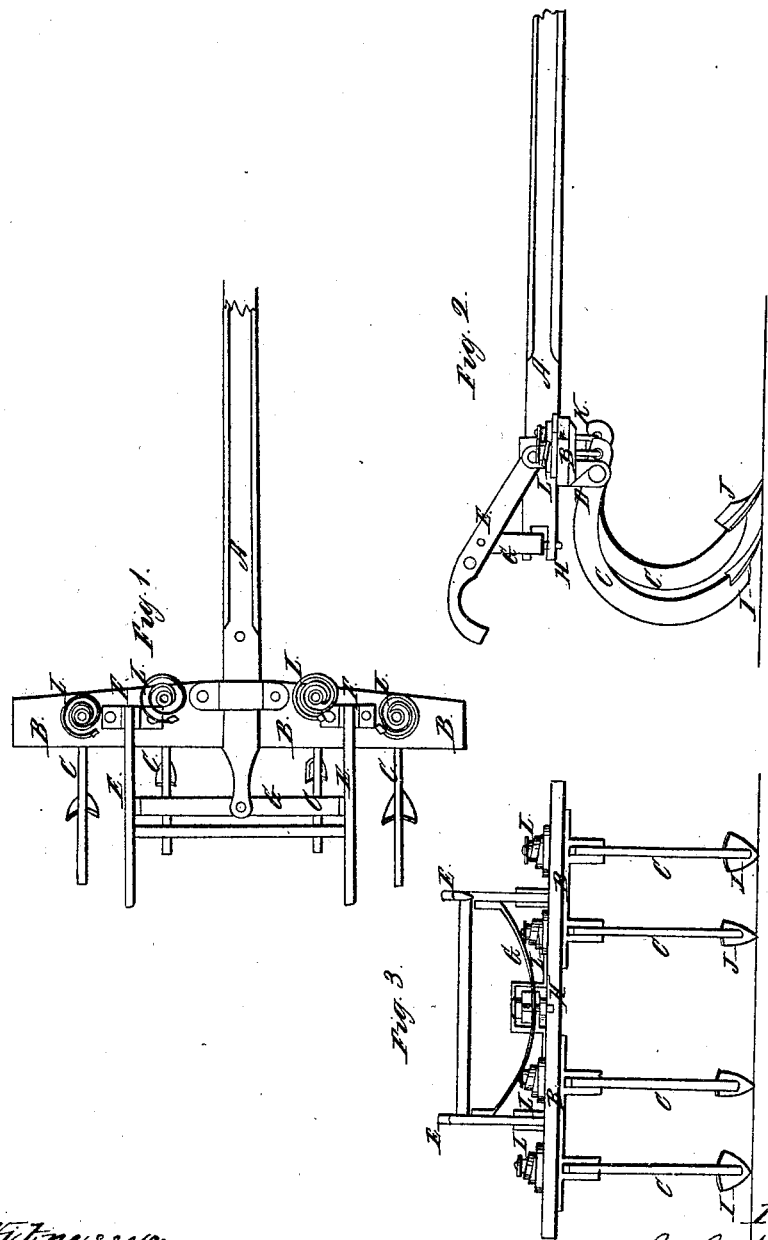

United States Patent Office.

J. C. HOFFEDITZ, OF MERCERSBURG, PENNSYLVANIA.

Letters Patent No. 60,892, dated January 1, 1867.

IMPROVEMENT IN CULTIVATORS.

The Schedule referred to in these Letters Patent and making part of the same.

TO ALL WHOM IT MAY CONCERN:

Be it known that I, J. C. HOFFEDITZ, of Mercersburg, in the county of Franklin, and State of Pennsylvania, have invented a new and improved Cultivator; and I do hereby declare the following to be a full, clear, and exact description of the nature, construction, and operation of the same, sufficient to enable those skilled in the art to which my invention appertains to understand and use the same, reference being had to the accompanying drawings, which are made a part of this specification, and in which—

Figure 1 is a top or plan view.
Figure 2 is a side elevation.
Figure 3 is a rear elevation.

The invention consists of a cultivator or marker, having adjustable spring standards and handle, and with shovels adapted to different kinds of work, or removable for the purpose of adapting the machine to a different class of work.

In the drawings, A is the tongue, B the beam. The standards C are pivoted to the hangers D. E E are the handles, pivoted to the beam at F, and secured to the hinder end of the tongue A by the brace G, by the means of the vertical bolt H. The lower end of each standard is provided with a shovel, I or J, as the case may require. In ordinary corn ploughing, two shovels work on each side of the row, and when the corn is small the shovel has a forwardly projecting flange or wing, which keeps clods from rolling on to the corn. When used as a scorer or marker, for laying out corn rows, the two middle standards are removed. To adjust the machine either as scorer or a cultivator, to mark the ground at the required distance between furrows, or to adapt the ploughs to work at the required distance from the corn, the hangers D are shifted toward or from the centre by changing the bolts which fasten the hangers to the beam into such of the holes in the latter as may accomplish the purpose. The handles E are made adjustable for the convenience of persons of different heights by placing the brace G above or below the end of the tongue A, or in the slot, as shown in fig. 2, and securing it by the bolt and nut H. Each standard is pivoted in its hanger, and at its forward end has a rod which connects with the summit of the helical spring L, so that as the shovel comes in contact with an unyielding object, such as a root or stone, the standard vibrates backwardly to allow the shovel to slip over the object and resume its forward position, under the influence of the spring, when the obstruction is passed.

Having described my invention, what I claim therein as new, and desire to secure by Letters Patent, is—

The arrangement shown and described, consisting of the adjustable and pivoted spring standards C, removable shares I J, and adjustable handles E.

J. C. HOFFEDITZ.

Witnesses:
SAMUEL L. TABLER,
J. N. BREWER.